United States Patent
Lee et al.

(10) Patent No.: US 7,940,858 B2
(45) Date of Patent: May 10, 2011

(54) APPARATUS AND METHOD FOR CALIBRATION IN A COMMUNICATION SYSTEM

(75) Inventors: Yong-Su Lee, Daejeon (KR); Youn-Ok Park, Daejeon (KR); Young-Jo Bang, Daejeon (KR); Kyung-Yeol Sohn, Daejeon (KR); Jae-Gun Jung, Daejeon (KR)

(73) Assignees: Samsung Electronics Co., Ltd (KR); Electronics and Telecommunications Research Institute (KR); KT Corporation (KR); SK Telecom Co., Ltd (KR); Hanaro Telecom., Inc. (KR)

( * ) Notice: Subject to any disclaimer, the term of this patent is extended or adjusted under 35 U.S.C. 154(b) by 1188 days.

(21) Appl. No.: 11/635,475

(22) Filed: Dec. 7, 2006

(65) Prior Publication Data

US 2007/0147537 A1 Jun. 28, 2007

(30) Foreign Application Priority Data

Dec. 9, 2005 (KR) .................. 10-2005-0120867

(51) Int. Cl.
*H04L 27/00* (2006.01)
*H04B 7/06* (2006.01)

(52) U.S. Cl. .................................... 375/299; 455/101

(58) Field of Classification Search .......... 375/295, 375/296, 219, 226, 220, 267, 347, 297, 316; 455/101, 132
See application file for complete search history.

(56) References Cited

U.S. PATENT DOCUMENTS

| | | | | |
|---|---|---|---|---|
| 5,881,369 | A  * | 3/1999 | Dean et al. | 455/78 |
| 6,704,551 | B2 * | 3/2004 | Riou et al. | 455/115.1 |
| 6,806,844 | B2 | 10/2004 | Azuma | |
| 7,181,205 | B1 * | 2/2007 | Scott et al. | 455/423 |
| 7,486,743 | B2 * | 2/2009 | Haiut | 375/296 |
| 2002/0113905 | A1 * | 8/2002 | Lee | 348/724 |
| 2004/0203472 | A1 * | 10/2004 | Chien | 455/68 |
| 2007/0136057 | A1 * | 6/2007 | Phillips | 704/229 |

FOREIGN PATENT DOCUMENTS

KR 1020030030878 4/2003
WO WO 01/91330 A1 11/2001

* cited by examiner

*Primary Examiner* — Tesfaldet Bocure
(74) *Attorney, Agent, or Firm* — The Farrell Law Firm, P.C

(57) ABSTRACT

In a calibration apparatus in a communication system, a modulation unit calculates a reference signal by modulating a downlink signal, and a digital Intermediate Frequency (IF) unit converts the reference signal to an intermediate frequency signal. An up-converter converts the intermediate frequency signal to a Radio Frequency (RF) signal, and a down-converter generates a received signal for each of the paths from the RF signal to be transmitted through each path. A calibrator calculates a correction value for each path and a delay value by using the reference signal and the received signal for each path.

19 Claims, 4 Drawing Sheets

APPARATUS AND METHOD FOR CALIBRATION IN A COMMUNICATION SYSTEM

PRIORITY

This application claims priority under 35 U.S.C. §119 to an application filed in the Korean Intellectual Property Office on Dec. 9, 2005 and assigned Serial No. 10-2005-0120867, the entire contents of which are incorporated herein by reference.

BACKGROUND OF THE INVENTION

1. Field of the Invention

The present invention relates generally to an apparatus and a method for calibration of a wireless transmitting apparatus. In particular, the present invention relates to an apparatus and a method for calibration of a wireless transmitting apparatus in an Orthogonal Frequency Division Multiplexing (OFDM) system.

2. Description of the Related Art

A fourth generation (4G) communication system such as wireless LAN (WLAN), and Digital Multimedia Broadcasting (DMB) requires large capacity data transmission, and thus it adapts an OFDM scheme in order to transmit high speed data of wideband. The OFDM scheme divides a using bandwidth into a plurality of subcarrier for transmitting data. The OFDM scheme divides a serial data row into N parallel data rows and transmits in each divided subcarrier, the data, so as to increase efficiency of the data.

In order to improve communication quality in a communication system, there is a method that a beam from an antenna is set towards a subscriber's direction by controlling a transmission power between a base station and a terminal or by controlling a horizontal direction and a tilt angle of a smart antenna of a base station. The method of controlling a horizontal direction and a tilt angle of a base station antenna is known to be more efficient than the scheme of controlling a transmission power because it enhances a Signal-to-Noise Ratio (SNR) by increasing a gain of the antenna for improving communication quality.

In order to precisely perform the method of increasing a gain of the antenna for improving communication quality, a delay and phase characteristic of a transmitter of each base station should be equalized. Therefore, a transmission calibration is performed for equalizing the delay and phase characteristic.

A transmission calibration is a method where a delay and phase characteristic of each path is previously calculated and corrected so that characteristics of signals outputted by a plurality of antennas cannot be varied according to a delay and phase difference of each Radio Frequency (RF) path.

Conventional calibration methods calculate a transmission function by comparing an additional reference signal with a signal output through a main path. A calibration signal transmitted by the conventional calibration method is an interference wave, and if a high-level calibration is performed, an interference signal factor is increased, and thus receiving sensitivity of a terminal may be deteriorated.

In addition, the calibration signal is an interference wave, and thus, a status of a transmit signal can be deteriorated according to a ratio of a transmitting data signal to the interference signal. Accordingly, an output power should be increased when the transmit signal has to be demodulated to have a signal quality requested by a receiver. In light of such drawbacks, the number of transmitter antennas or receivers should be reduced.

A conventional calibration apparatus comprises an additional antenna or a signal generator, and thus a manufacturing cost is increased and the structure of the calibration apparatus becomes complex.

SUMMARY OF THE INVENTION

It is, therefore, an object of the present invention to provide an apparatus and a method for calibration of a wireless transmitting apparatus in a base station smart antenna having advantages of obtaining a transmission function for an RF path by using a preamble signal in an initial portion of a downlink signal.

According to an aspect of the present invention, there is provided a calibration apparatus that includes a modulation unit for modulating a downlink signal to calculate a reference signal; a digital Intermediate Frequency (IF) unit for converting the reference signal into an intermediate frequency (IF) signal; an up-converting unit for converting the IF signal to a Radio Frequency (RF) signal; a down-converter for generating a received signal for each of the paths from the RF signal to be transmitted through each path; and a calibrator for calculating a correction value for each path and a delay value for each path by using the reference signal and the received signal for each path.

According to another aspect of the present invention, there is provided a calibration method that includes calculating a synchronization signal and a reference signal from a downlink signal that is inputted for transmission; calculating a received signal for each path through the reference signal; calculating a-correction value for each path and a delay value for each path by using a correction value for each path and a delay value for each path; and calibrating a path delay of the downlink signal and a phase characteristic of the downlink signal by using the correction value for each path and the delay value for each path.

According to yet another aspect of the present invention, there is provided a calibration apparatus that includes means for calculating a reference signal from a downlink signal; means for calculating a received signal for each path through the reference signal; means for calculating a correction value for each path and a delay value for each path by using the reference signal and the received signal for each path; and means for calibrating a downlink signal by using the correction value for each path and the delay value for each path.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
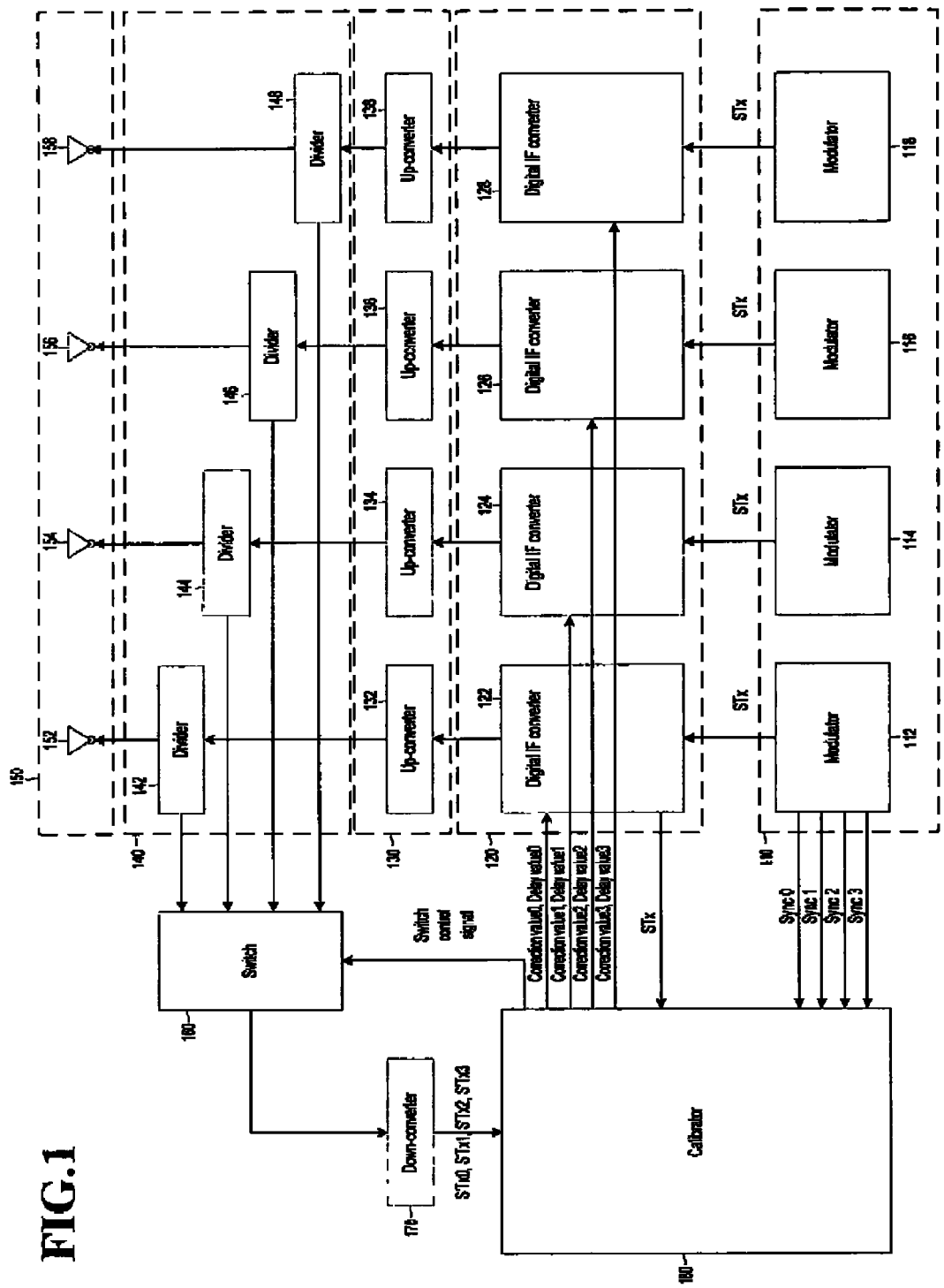
FIG. 1 is a block diagram illustrating an internal structure of a calibration apparatus according to an exemplary embodiment of the present invention.

In the following detailed description, only certain preferred embodiments of the present invention will now be described in detail with reference to the accompanying drawings. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 is a block diagram illustrating an internal structure of a calibration apparatus according to an exemplary embodiment of the present invention.

A calibration apparatus according to the exemplary embodiment of the present invention includes a modulation unit 110, a digital Intermediate Frequency (IF) unit 120, an up-converting unit 130, a dividing unit 140, an antenna unit 150, a switch 160, a down-converter 170 and a calibrator 180.

The modulation unit 110 includes a plurality of modulators 112, 114, 116, and 118 corresponding to a plurality of paths and modulates a downlink signal including a preamble signal. The modulation unit 110 modulates downlink signals for the paths for calculating synchronization signals sync0, sync1, sync2, and sync3 for the plurality of paths and reference signals $S_{Tx}$ for the plurality of paths, and transmits the synchronization signals and the reference signals to the calibrator 180 and the digital IF unit 120, respectively. According to the exemplary embodiment of the present invention, a preamble signal can be the reference signal $S_{Tx}$.

The digital IF unit 120 includes a plurality of digital IF converters 122, 124, 126, and 128 corresponding to the plurality of paths, respectively. The digital IF unit 120 converts the reference signal $S_{Tx}$ received through each path from the modulation unit 110 to an intermediate frequency signal and performs a Digital to Analog Conversion (DAC). The digital IF converter 122 of the digital IF unit 120 transmits the reference signal $S_{Tx}$ to the calibrator 180.

The up-converting unit 130 includes a plurality of up-converters 132, 134, 136, and 138 corresponding to the plurality of paths, respectively. The up-converting unit 130 converts the intermediate frequency signal for each path received from the digital IF unit 120 to an RF signal for each path and transmits the RF frequency signal for each path to the dividing unit 140.

The dividing unit 140 includes a plurality of dividers 142, 144, 146, and 148 corresponding to the plurality of paths, respectively. The dividing unit 140 distributes the RF signal for each path received from the up-converting unit 130 to the antenna unit 150 and the switch 160. The antenna unit 150 includes a plurality of antennas 152, 154, 156, 158. The plurality of antennas 152, 154, 156, 158 transmit the RF signal received from the dividing unit 140 to wireless networks.

The switch 160 transmits the signal received from the dividing unit 140 to the down-converter 170 according to a switch control signal received from the calibrator 180. The down-converter 170 generates a received signal $S'_{Tx0}$, $S'_{Tx1}$, $S'_{Tx2}$, and $S'_{Tx3}$ for each path by down-converting the RF signal for each path received from the switch 160, and transmits the received signals $S'_{Tx0}$, $S'_{Tx1}$, $S'_{Tx2}$, and $S'_{Tx3}$ to the calibrator 180.

The calibrator 180 receives the synchronization signals sync0, sync1, sync2, and sync3 from the plurality of modulator 112, 114, 116, and 118 of the modulation unit 110 and stores a predetermined portion of the reference signal $S_{Tx}$ received from the digital IF unit 120. In addition, the calibrator 180 transmits the switch control signal to the switch 160, and thus the signal received from the dividing unit 140 is controlled in order to be divided by time. More specifically, the calibrator 180 stores a predetermined portion of the reference signals $S'_{Tx0}$, $S'_{Tx1}$ $S'_{Tx2}$, and $S'_{Tx3}$ for each path from the down-converter 170 according to the each synchronization signal sync0, sync1, sync2, and sync3. The calibrator 180 uses the reference signal $S_{Tx}$ received from the digital IF unit 120 and the received signal $S'_{Tx0}$, $S'_{Tx1}$, $S'_{Tx2}$, and $S'_{Tx3}$ for each path from the down-converter 170 for calculating a correction value (correction value0, correction value1, correction value2, and correction value3) for each path and a delay value (delay value0, delay value1, delay value2, and delay value3) for each path, and it transmits the calculated correction value and delay value to the corresponding respective digital IF converter 122, 124, 126, and 128 of the digital IF unit 120.

The digital IF unit 120 multiplies the correction value for each with the downlink signal for each and delays the downlink signal for each path by using the delay value for each path, and thus the calibration is completed. Here, an initial weight value (i.e., an initial correction value) can be set as 1 in transmitting the first downlink signal, and a delay value can be set as 0.

Figure 2:
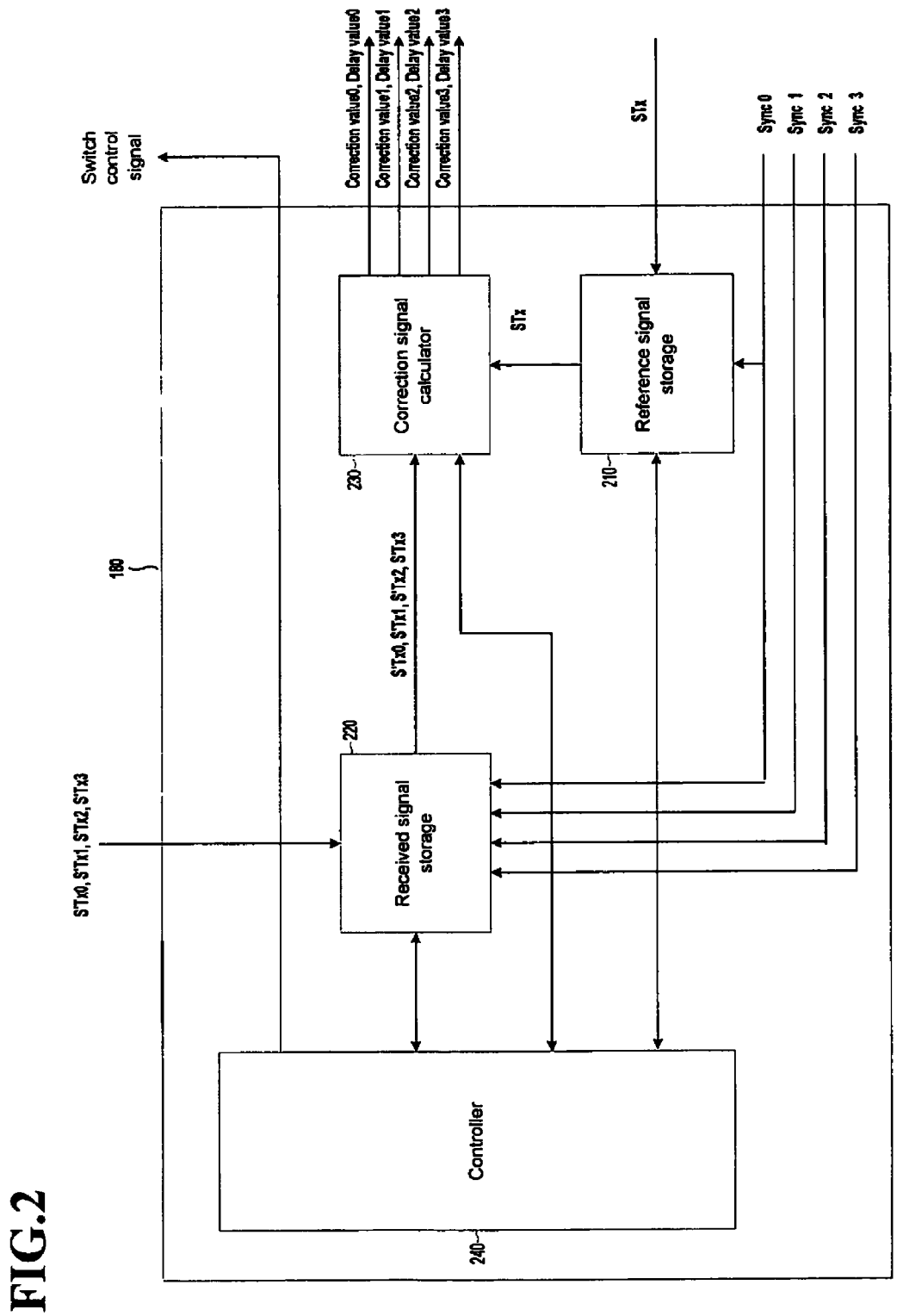
FIG. 2 is a block diagram illustrating an internal structure of a calibrator according to the exemplary embodiment of the present invention.

FIG. 2 is a block diagram illustrating an internal structure of a calibrator according to the exemplary embodiment of the present invention.

The detailed internal structure of the calibrator 180 according to the exemplary embodiment of the present invention includes a reference signal storage 210, a received signal storage 220, a correction signal calculator 230 and a controller 240.

The reference signal storage 210 receives the reference signal $S_{Tx}$ from the digital IF unit 120 and stores same.

The received signal storage 220 receives the synchronization signals sync0, sync1, sync2, and sync3 for each path from the modulation unit 110, and it stores the received signal $S'_{Tx0}$, $S'_{Tx1}$, $S'_{Tx2}$, and $S'_{Tx3}$ for each path by a predetermined period according to the received synchronization signal.

The correction signal calculator 230 uses the reference signal $S_{Tx}$ transmitted from the reference signal storage 210 and the received signal $S'_{Tx0}$, $S'_{Tx1}$, $S'_{Tx2}$, and $S'_{Tx3}$ for each path transmitted from the received signal storage 220 for calculating the correction value for each path (correction value0, correction value1, correction value2, and correction value3) and the delay value for each path (delay value0, delay value1, delay value2, and delay value3) by, and it transmits the calculated correction value for each path and the delay value for each path to the digital IF unit 120. The internal structure and the function of the correction signal calculator 230 will be described with reference to FIG. 3.

The controller 240, which controls general operations and operating sequences of the calibrator 180, is connected with the reference signal storage 210, the received signal storage 220 and the correction signal calculator 230. The controller 240 generates a control signal for controlling the operations and transmits the same to the reference signal storage 210, the received signal storage 220 and the correction signal calculator 230.

Figure 3:
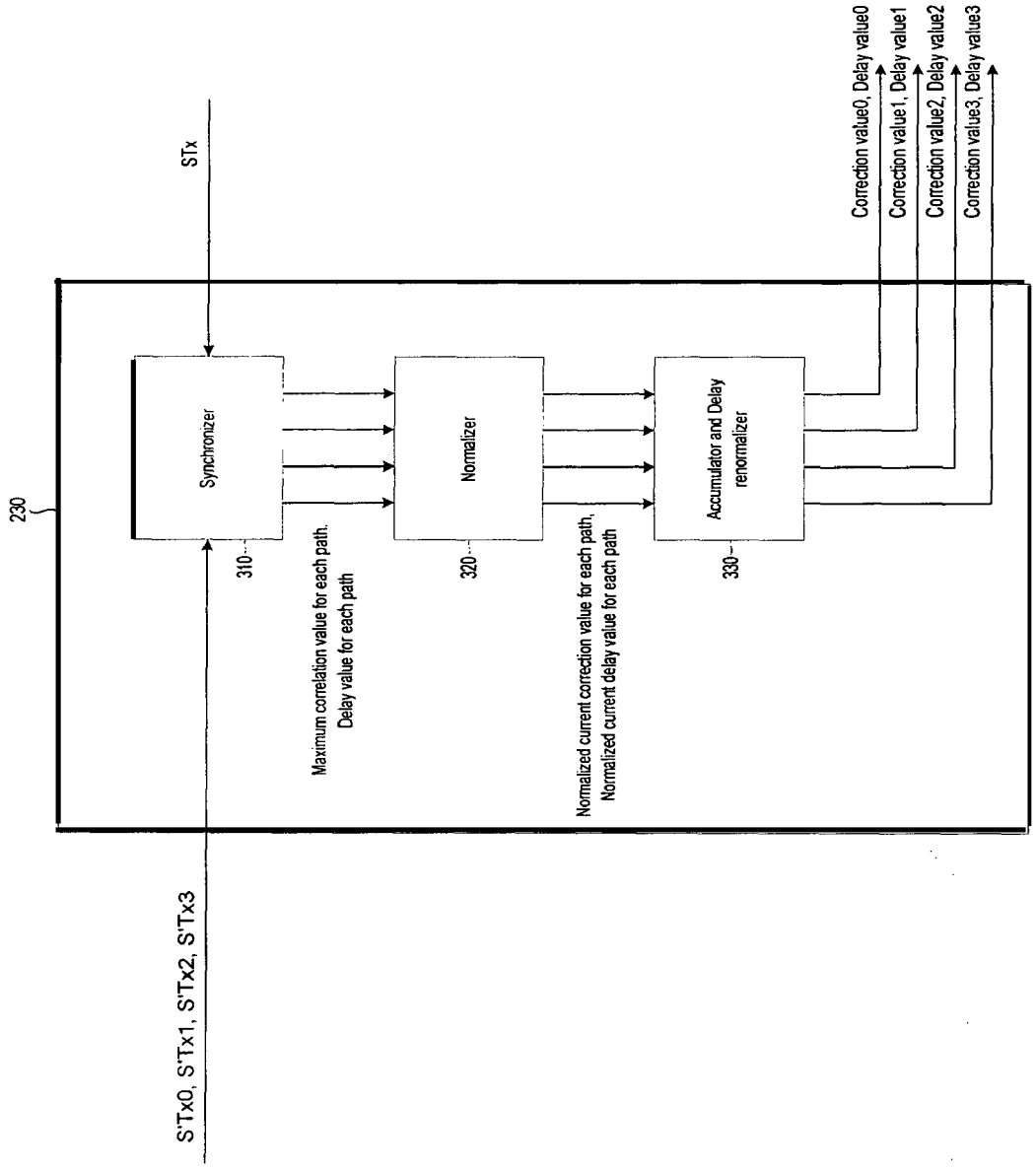
FIG. 3 is a block diagram illustrating an internal structure of a correction signal calculator according to the exemplary embodiment of the present invention.

FIG. 3 is a block diagram illustrating an internal structure of a correction signal calculator according to the exemplary embodiment of the present invention. The correction signal calculator 230 includes a synchronizer 310, a normalizer 320, and an accumulator and delay renormalizer 330.

The synchronizer 310 cross-correlates the received signal for each path $S'_{Tx0}$, $S'_{Tx1}$, $S'_{Tx2}$, and $S'_{Tx3}$ and the reference signal $S_{Tx}$ for calculating a maximum correlation value for each path and a temporary delay value for each path.

The normalizer 320 divides the maximum correlation values for the plurality of paths by a maximum correlation value for a first path that is calculated from the synchronizer 310 for calculating a normalized correction value for each path. At this time, the correction value of the first path always becomes 1. A maximum delay value is selected among the temporary delay values for the plurality of paths that are calculated by the synchronizer 310, and a normalized current delay value for each path is calculated by subtracting the maximum delay value from the temporary delay values of the plurality of paths.

The accumulator and delay renormalizer 330 multiplies the correction value that was previously used for each path and the normalized current correction value for each path for calculating the correction value (correction value0, correction value1, correction value2, and correction value3), and it adds the normalized current delay value for each path to the delay value that was previously used for each path for calculating an accumulated delay value for each path. A minimum delay value is selected among the accumulated delay values, and the minimum delay value is subtracted form the accumulated delay value for each path so that a renormalized final delay value (delay value0, delay value1, delay value2, and delay value3) for each path is calculated.

Figure 4:
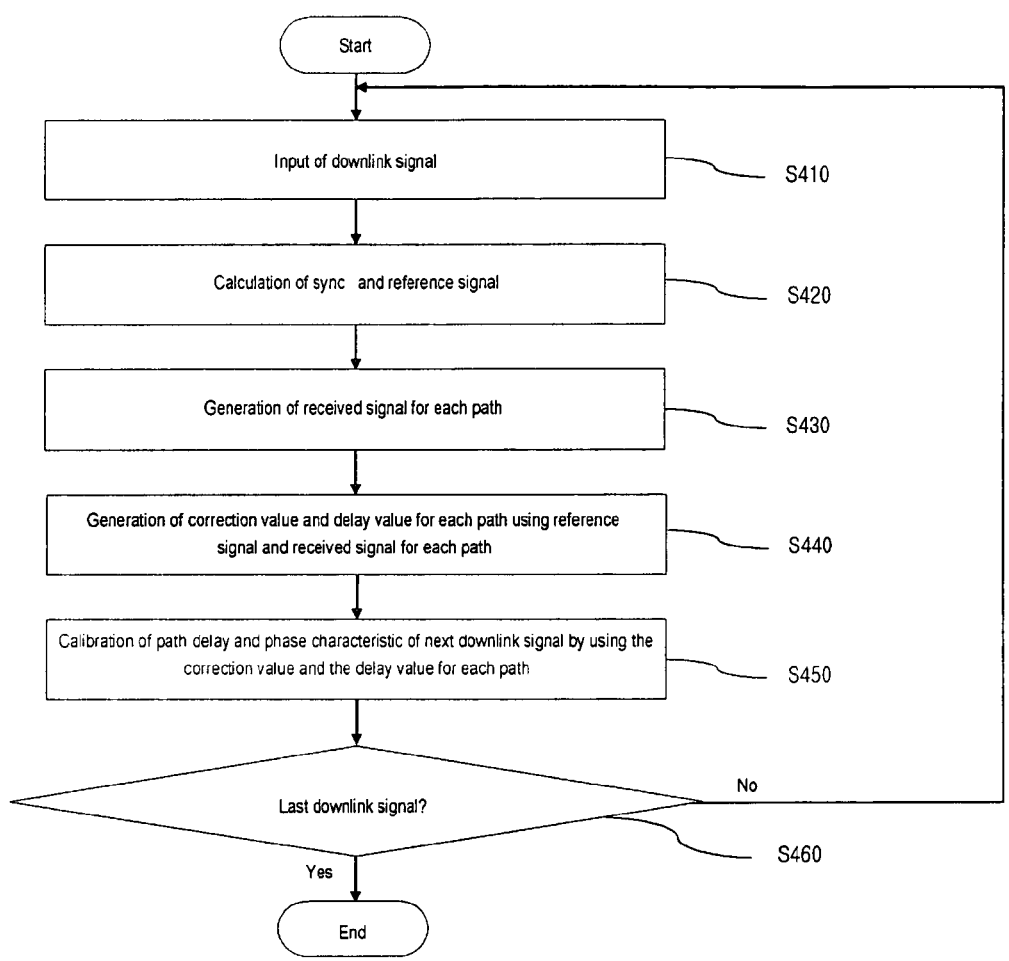
FIG. 4 is a flowchart illustrating a calibration method according to the exemplary embodiment of the present invention.

FIG. 4 is a flowchart illustrating a calibration method according to the exemplary embodiment of the present invention.

At step S410, when a downlink signal including a preamble signal is inputted from a downlink signal to a calibration apparatus consistent with the exemplary embodiment of the present invention, the downlink signal for each path is received by the modulation unit 110 and a synchronization signal for each path and a reference signal $S_{Tx}$ for each path are calculated from the downlink signal. Here, the synchronization signal for each path calculated from the downlink signal is transmitted to the calibrator 180, and at step S420 the reference signal $S_{Tx}$ is transmitted to the digital IF unit 120.

The digital IF unit 120 transmits and stores the received reference signal $S_{Tx}$ to the calibrator 180, and it converts the reference signal $S_{Tx}$ into an IF signal. The IF signal is converted into an RF signal by the up-converting unit 130, and the RF signal is transmitted to a wireless network by the dividing unit 140 and the antenna unit 150. The RF signal received by the dividing unit 140 is converted so as to generate received signals $S'_{Tx0}$, $S'_{Tx1}$, $S'_{Tx2}$, and $S'_{Tx3}$ for each path through the switch 160 and the down-converter 170 at step S430.

After the calibrator 180 receives the synchronization signal for each path, the reference signal $S_{Tx}$ and the received signals $S'_{Tx0}$, $S'_{Tx1}$, $S'_{Tx2}$, and $S'_{Tx3}$ for each path at the steps S420 and S430, the synchronizer 310 in the calibrator 180 cross-correlates between the reference signal and the received signal for each path for calculating a maximum correlation value and temporary delay value for each path. In addition, the normalizer 320 calculates a normalized correction value for each path and a normalized delay value for each path by using the maximum correlation value, and the accumulator and delay renormalizer 330 calculates a correction value for each path and a delay value for each path at step S440.

The correction value for each path and the delay value for each path that are generated by the calibrator 180 are input to the digital IF unit 120 again. At step S450, the digital IF unit 120 calibrates a path delay of next downlink signal and a phase characteristic of next downlink signal by using the correction value for each path and the delay value for each path. The downlink signal that is calibrated for the path delay and the phase characteristic as described above is converted to an RF signal by the up-converting unit 130 and transmitted to a receiver through the dividing unit 140 and the antenna unit 150. At this time, the RF signals transmitted through the dividing unit 140 and the antenna unit 150 are converted as received signals $S'_{Tx0}$, $S'_{Tx1}$, $S'_{Tx2}$, and $S'_{Tx3}$ for calculating correction values and delay values of the next downlink signals inputted through the switch 160 and the down-converter 170.

Such a process described above herein is repeated until a last downlink signal is input, and, if the last downlink signal is transmitted, the calibration for transmission at a base station of the communication system is ended.

According to the exemplary embodiment of the present invention, a transmission function of an RF path can be obtained by using a preamble signal included in an initial portion of a downlink signal of an OFDM system, and thus additional antenna or additional reference signal generator are not required. Therefore, the structure of the calibrator can be simplified, and thus manufacturing time and cost for the calibrator can be reduced. In addition, the transmission function can be exactly obtained at a time domain, and a correction value and a delay value can be applied at a time domain.

The present invention can be realized not only through a method and an apparatus, but also through a program that can perform functions corresponding to configurations of the present invention or a recording medium storing the program, and which can be easily realized by a person skilled in the art.

While this invention has been shown and described with reference to certain preferred embodiments thereof, it is to be understood that the present invention is not limited to the disclosed embodiments, but, on the contrary, is intended to cover various modifications and equivalent arrangements included within the spirit and scope of the appended claims.

What is claimed is:

1. An apparatus for calibration of a transmitter having a plurality of antennas, comprising:
    a modulation unit for modulating a downlink signal to calculate a reference signal;
    a digital Intermediate Frequency (IF) unit for converting the reference signal to an IF signal;
    an up-converting unit for converting the IF signal to a Radio Frequency (RF) signal;
    a down-converter for generating a received signal for each of a plurality of paths from the RF signal to be transmitted through each path, the plurality of paths respectively corresponding to the plurality of antennas; and
    a calibrator for calculating a correction value for each path and a delay value for each path by using the reference signal and the received signal for each path,
    wherein the digital IF unit uses the delay value for each path and the correction value for each path to calibrate a path delay between the paths of a next downlink signal and a phase characteristic between the paths of the next downlink signal.

2. The apparatus of claim 1, wherein the reference signal comprises a preamble signal.

3. The apparatus of claim 1, wherein the modulation unit calculates a synchronization signal for each path by modulating the downlink signal, and the calibrator stores the received signal for each path according to a synchronization signal for each path.

4. The apparatus of claim 1, further comprising:
    an antenna unit including a plurality of antennas and for transmitting the RF signal for each path;
    a switch for transmitting the RF signal for each path to be transmitted through the antenna unit to the down-converter; and
    a dividing unit for distributing the RF signal for each path received from the up-converter to the antenna unit and the switch.

5. The apparatus of claim 1, wherein the calibrator comprises:
   a reference signal storage for receiving and storing the reference signal from the digital IF unit;
   a received signal storage for receiving and storing the received signal for each path from the down-converter;
   a correction signal calculator for calculating the correction value for each path and the delay value for each path by using the reference signal and the received signal for each path, and transmitting the correction value and the delay value to the digital IF unit; and
   a controller for generating a control signal for operation control of the reference signal storage, the received signal storage, and the correction signal calculator, and transmitting the control signal to the reference signal storage, the received signal storage, and the correction signal calculator.

6. The apparatus of claim 5, wherein the correction signal calculator comprises:
   a synchronizer for calculating a maximum correlation value for each path and a temporary delay value for each path through a correlation between the received signal for each path and the reference signal;
   a normalizer for calculating a normalized correction value for each path by using the maximum correlation value for each path, and calculating a normalized delay value for each path by using the temporary delay value for each path; and
   an accumulator and delay renormalizer for calculating the correction value for each by using the normalized correction value for each path and a previous correction value for each path, and calculating the delay value for each path by using the normalized delay value for each path and a previous delay value for each path.

7. The apparatus of claim 6, wherein the accumulator and delay renormalizer multiplies the normalized correction value for each path and the previous correction value for each path for calculating the correction value for each path.

8. The apparatus of claim 6, wherein the accumulator and delay renormalizer sums the previous delay value for each path and the normalized delay value for each path for calculating an accumulated delay value for each path, and for obtaining a minimum delay value among the accumulated delay values for the paths, and subtracts the minimum delay value from the accumulated delay value for each path for calculating the final delay value for each path.

9. The apparatus of claim 6, wherein the normalizer divides the maximum correlation value for each path by a maximum correlation values for the paths for calculating the normalized correction value for each path by, and for obtaining a maximum delay value among the delay value for the paths, and subtracts the delay value for each path from the maximum delay value for calculating the normalized delay value for each path.

10. The apparatus of claim 1, wherein the digital IF unit multiplies the correction value for each path and the downlink signal for each path for calibrating the phase characteristic, and delays the downlink signal for each path by using the delay value for each path for calibrating the path delay.

11. A calibration method for transmitting a downlink signal in a transmitter having a plurality of antennas, the calibration method comprising: calculating a reference signal from a downlink signal that is inputted for transmission;
   calculating a received signal for each of a plurality of paths through the reference signal, the plurality of paths respectively corresponding to the plurality of antennas;
   calculating a correction value for each path and a delay value for each path by using the received signal and the reference signal for each path; and
   calibrating a path delay between the paths of the downlink signal and a phase characteristic between the paths of the downlink signal by using the delay value for each path and the correction value for each path.

12. The calibration method of claim 11, wherein the reference signal comprises a preamble signal.

13. The calibration method of claim 11, wherein calculating the received signal for each path comprises:
   converting the reference signal to an Intermediate Frequency (IF) signal;
   converting the IF signal to a Radio Frequency (RF) signal; and
   generating the received signal for each path by using the RF signal for each path.

14. The calibration method of claim 11, wherein calculating the correction value for each path and the delay value for each path comprises:
   calculating a maximum correlation value for each path and a temporary delay value for each path by cross-correlation between the reference signal and the received signal for each path;
   calculating a normalized correction value for each path and a normalized delay value for each path from the maximum correlation value and the temporary delay value; and
   calculating the correction value for each path from the normalized correction value for each path and calculating the delay value for each path from the normalized delay value for each path.

15. The calibration method of claim 14, wherein calculating the normalized correction value and normalized delay value comprises:
   calculating the normalized correction value by dividing the maximum correlation value for each path by the maximum correlation value; and
   calculating the normalized delay value for each path by subtracting a maximum value among the temporary delay values for the paths from the temporary delay value for each path.

16. The calibration method of claim 14, wherein calculating the delay value for each path comprises:
   calculating the correction value for each path by multiplying the normalized correction value for each path and a previous correction value for each path;
   calculating an accumulated delay value for each path by summing the normalized delay value for each path and a previous delay value for each path;
   obtaining a minimum delay value among the accumulated delay values for the paths; and
   calculating the delay value for each path by subtracting the minimum delay value from the accumulated delay value for each path.

17. An apparatus for calibration of a transmitter having a plurality of antennas, comprising:
   means for calculating a reference signal from a downlink signal;
   means for calculating a received signal for each of a plurality of paths through the reference signal, the plurality of paths respectively corresponding to the plurality of antennas;
   means for calculating a correction value for each path and a delay value for each path by using the reference signal and the received signal for each path; and means for calibrating a phase characteristic between the paths of the downlink signal and a path delay between the paths of the downlink signal by using the correction value for each path and the delay value for each path.

18. The apparatus of claim 17, further comprising:

means for converting the reference signal to a Radio Frequency (RF) signal for each path; and means for generating the received signal for each path by using the RF signal for each path.

19. The apparatus of claim 17, wherein the reference signal comprises a preamble signal.

\* \* \* \* \*